Sept. 3, 1929.   J. W. LOVELL   1,727,071
NET HAULING DEVICE
Filed May 14, 1928
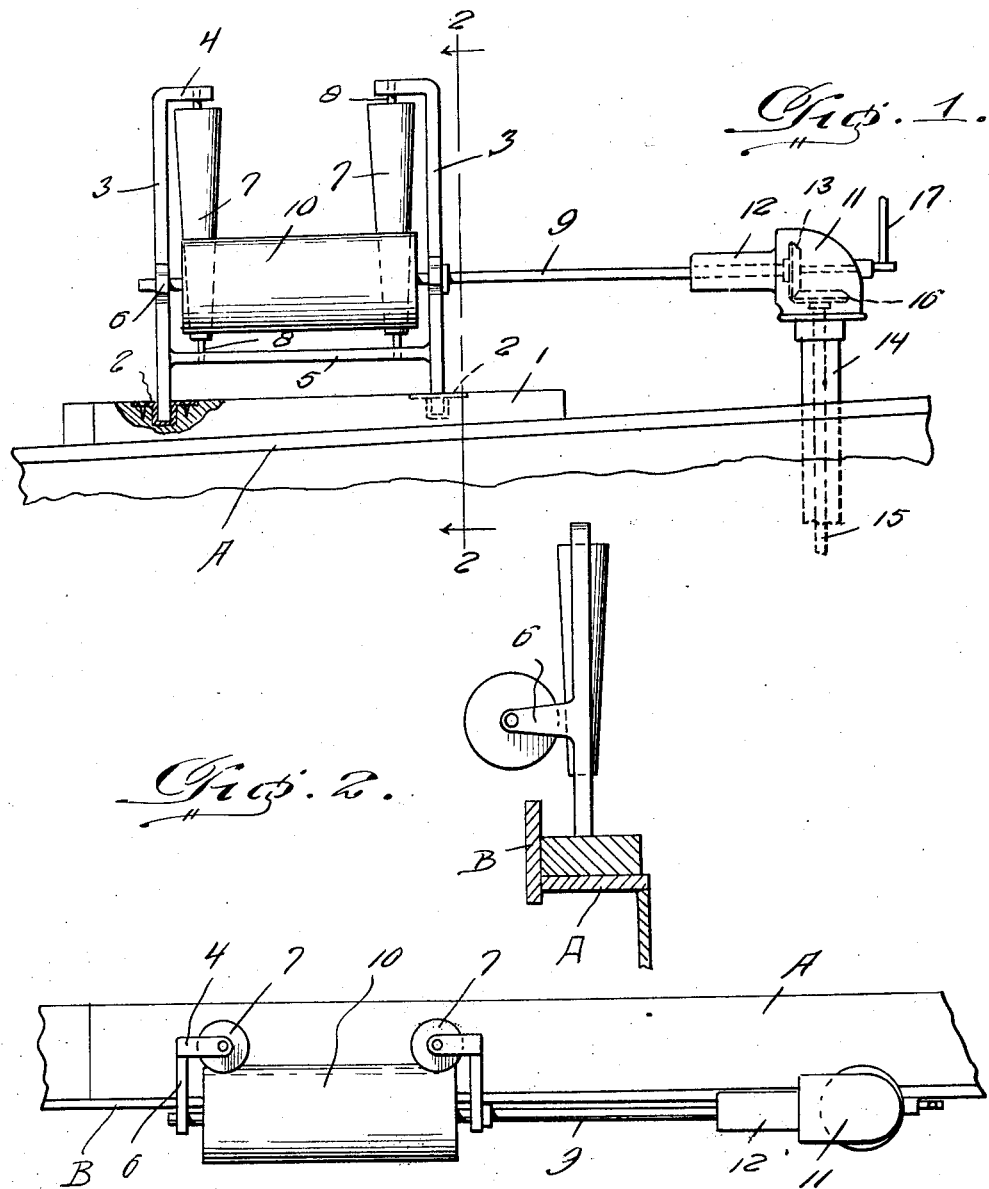
Inventor
J. W. Lovell,
By Clarence A. O'Brien
Attorney Patented Sept. 3, 1929.

1,727,071

UNITED STATES PATENT OFFICE.

JAMES W. LOVELL, OF ASTORIA, OREGON.

NET-HAULING DEVICE.

Application filed May 14, 1928. Serial No. 277,578.

The present invention relates to improvement in devices for use on fishing posts, whereby the large fishing net, usually hauled from the water by the hands of the fisherman, may be removed from the water in quicker and far more efficient manner.

The main purpose of this device is to provide means whereby a net may be removed from the water without the liability of damaging the same, and furthermore, wherein the same will facilitate the handling of the net by providing rollers arranged in a novel fashion, so that the line leading to the net, or in fact, portions of the net proper may be drawn through this device easily and without extensive or undue exertion on the part of the fishermen.

An important object resides in providing a device of this character which may be mounted quickly, and wherein the various operative parts are so arranged as to reduce the liability that the same will become inoperative, and moreover, where the same may be readily demounted when not desired for use.

Another object resides in providing a drive means for one of the rollers included in this invention, which will facilitate the falling of the net, when the same is drawn taut over the said roller.

Still another object resides in presenting a device of this type, which is very simple in construction, so as to render its cost of manufacture low, and within the reach of persons operating in the fishing industry.

After reading the following specification and claims, other very novel objects and advantages will readily become apparent.

In the drawings:—

Figure 1 represents a fragmentary portion of the gunwale of a ship with the improved net holding device, mounted for operation thereon.

Fig. 2 represents a sectional view thru the gunwale of a boat, the same showing the net hauling device in end elevation, and Fig. 3 represents a top plan view of the device as disclosed in Fig. 1.

Now for a more detail description of this invention, reference is made to the drawing in which like numerals designate like parts. For the purpose of illustrating the manner in which this device is mounted for use, in Fig. 1, the gunwale portion A is shown associated with the side boards B (shown in Figure 2) removed for closing the base 1, constituting a portion of this invention. This base is provided with a pair of spacedly arranged sockets 2,—2, which are disposed in openings in the top surface of the base, whereby the top portion thereof will be in flush relation with the top of the base. This base may be of suitable length, and is preferably tapered longitudinally, to compensate for the longitudinal curvature of the gunwale.

An upstanding frame includes a pair of posts 3—3 which are shaped with their upper end portions bent inwardly at 4. A cross bar 5 connects the posts adjacent their lower ends, while each post is further provided with a laterally projecting arm 6.

A pair of frusto-conically shaped rollers 7—7 are each provided with pintle projections 8 at their respective ends. These rollers are mounted in inverted position between the inwardly bent upper ends of the respective posts, and the cross bar 5, in a manner clearly shown in Fig. 1 of the drawing.

An elongated shaft 9 has one end portion thereof journaled through the laterally projecting arm 6, while an enlarged roller 10 is fixed thereon and between the respective arms, 6. The opposite end of this shaft projects through a housing 11. This housing is provided with a shank 12 through which the shaft is journaled, while a bevel gear 13 is keyed to the shaft within the housing. A depending shaft housing 14 extends downwardly through the deck of the boat and encases a shaft 15 having driven connection with the power means of the boat whereby the roll 10 may be operated. The upper end of this shaft 15 is journaled through the lower side of the housing, and is provided with a beveled gear 16, keyed to the end thereof, and in meshed relation with the bevel gear 13.

The projecting end of the shaft 9 is provided with a suitable handle 17, whereby the roller 10 may be rotated with the shaft 9 in lieu of the operation of the power shaft 15.

In the use of this device, the net line is trained over the roller 10, so that when the line has been drawn taut, the shaft 9 may be rotated for facilitating the hauling of the net and the movement of the line over the horizontal roller.

When the net is being hauled in upon the roller 10, the inverted frusto-conical rollers 7—7, will tend to maintain the net upon the roller 10, so that the same will not become displaced therefrom.

Having thus described the invention, what I claim as new is:—

In a net hauling guide for boats, a support, said support being provided with a pair of spaced socket members, a pair of upstanding frame members arranged upon the support and within the socket members, the upper ends of the members being bent inwardly, a cross bar connecting the members adjacent their lower ends, a laterally extending arm projecting from each member, a roller mounted between said arms, and a pair of frusto-conical shaped rollers, each of said rollers being mounted for free rotation between the inwardly bent upper ends of the frame and the cross bar.

In testimony whereof I affix my signature.

JAMES W. LOVELL.